United States Patent
Liu et al.

(10) Patent No.: US 12,114,191 B2
(45) Date of Patent: Oct. 8, 2024

(54) METHOD AND APPARATUS FOR RECEIVING SYSTEM INFORMATION, METHOD AND APPARATUS FOR SENDING SYSTEM INFORMATION, AND STORAGE MEDIUM

(71) Applicant: ZTE Corporation, Shenzhen (CN)

(72) Inventors: Xu Liu, Shenzhen (CN); Bo Dai, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 403 days.

(21) Appl. No.: 17/626,776

(22) PCT Filed: Jul. 15, 2020

(86) PCT No.: PCT/CN2020/102016
§ 371 (c)(1),
(2) Date: Jan. 12, 2022

(87) PCT Pub. No.: WO2021/008542
PCT Pub. Date: Jan. 21, 2021

(65) Prior Publication Data
US 2022/0361017 A1    Nov. 10, 2022

(30) Foreign Application Priority Data

Jul. 17, 2019  (CN) .......................... 201910647197.0

(51) Int. Cl.
*H04W 24/08*  (2009.01)
*H04L 1/1867*  (2023.01)
(Continued)

(52) U.S. Cl.
CPC .......... *H04W 24/08* (2013.01); *H04L 1/1896* (2013.01); *H04W 72/1273* (2013.01);
(Continued)

(58) Field of Classification Search
None
See application file for complete search history.

(56) References Cited

U.S. PATENT DOCUMENTS

| 2016/0219614 A1* | 7/2016 | Webb ................. H04W 72/121 |
| 2018/0220288 A1* | 8/2018 | Agiwal ................ H04W 4/30 |

(Continued)

FOREIGN PATENT DOCUMENTS

| CN | 101043671 A | 9/2007 |
| CN | 101686092 A | 3/2010 |

(Continued)

OTHER PUBLICATIONS

International Search Report and Written Opinion for International Application No. PCT/CN2020/102016, mailed Oct. 20, 2020.

(Continued)

*Primary Examiner* — Saumit Shah
(74) *Attorney, Agent, or Firm* — Wolf, Greenfield & Sacks, P.C.

(57) ABSTRACT

A method and apparatus for receiving system information, a method and apparatus for sending system information, and a non-transitory computer-readable storage medium are disclosed. The method for receiving system information may include: receiving system information (SI) reception indication information sent by a base station; and receiving system information indicated by the SI reception indication information.

16 Claims, 2 Drawing Sheets

Receive SI reception indication information sent by a base station — S120

Receive system information indicated by the SI reception indication information — S140

(51) Int. Cl.
*H04W 72/1273* (2023.01)
*H04W 72/23* (2023.01)
*H04W 74/0833* (2024.01)
*H04W 76/30* (2018.01)
*H04W 80/02* (2009.01)

(52) U.S. Cl.
CPC ....... *H04W 72/23* (2023.01); *H04W 74/0833* (2013.01); *H04W 76/30* (2018.02); *H04W 80/02* (2013.01)

(56) References Cited

U.S. PATENT DOCUMENTS

| | | | | |
|---|---|---|---|---|
| 2019/0349837 | A1* | 11/2019 | Shih | H04W 76/11 |
| 2020/0351818 | A1* | 11/2020 | Park | H04W 4/90 |
| 2022/0022242 | A1* | 1/2022 | Liu | H04W 48/12 |
| 2022/0201522 | A1* | 6/2022 | Tao | H04L 5/0053 |
| 2022/0240326 | A1* | 7/2022 | Rune | H04W 56/001 |

FOREIGN PATENT DOCUMENTS

| | | | |
|---|---|---|---|
| CN | 101877825 | A | 11/2010 |
| CN | 103428855 | A | 12/2013 |
| CN | 103906098 | A | 7/2014 |
| CN | 110536250 | A | 12/2019 |

OTHER PUBLICATIONS

[No Author Listed] Further discussion for SI broadcast in non-initial BMP. CATT Agenda Item 10.4.1.6.7. 3GPP TSG-RAN WG2 Meeting #102. May 21-15, 2018:1-3.

[No Author Listed] Paging in connected mode. Ericsson Agenda Item 10.4.5.3. 3GPP TSG-RAN2 Meeting #103bis. Oct. 8-12, 2018:1-4.

[No Author Listed] SI Modification. CATT Agenda Item 10.4.1.6.4. 3GPP TSG-RAN WG2 Meeting #99bis . Oct. 9-13, 2017:1-4.

First Office Action for Chinese Application No. 201910647197.0 dated Jun. 23, 2022.

Second Office Action for Chinese Application No. 201910647197.0 dated Sep. 22, 2022.

First Examination Report for Indian Application No. 202227008183 dated Jul. 14, 2022.

[No Author Listed], 3GPP TSG-RAN WG2 Meeting #99bis. R2-1710286. Oct. 2017. 4 pages.

First Office Action for Korean Application No. 10-2022-7003457, dated Jun. 25, 2024.

* cited by examiner

METHOD AND APPARATUS FOR RECEIVING SYSTEM INFORMATION, METHOD AND APPARATUS FOR SENDING SYSTEM INFORMATION, AND STORAGE MEDIUM

CROSS-REFERENCE TO RELATED APPLICATION

This application is a national stage filing under 35 U.S.C. § 371 of international application number PCT/CN2020/102016, filed on Jul. 15, 2020, which claims priority to Chinese patent application No. 201910647197.0 filed on Jul. 17, 2019. The contents of these applications are incorporated herein by reference in their entirety.

TECHNICAL FIELD

The present disclosure relates to radio communication networks and to a system information receiving and sending method, apparatus, and a non-transitory computer-readable storage medium.

BACKGROUND

In a case where Non-Bandwidth reduced Low complexity (Non-BL) user equipment (UE) in a coverage enhancement (CE) mode and in a connected state has received a warning notice from a public security system (for example, Earthquake and Tsunami Warning System (ETWS)), however, the narrow band for broadcasting system information (SI) following the warning notice may differ from the UE-specific narrow band for data transmission, how to enable the UE to receive the system information becomes a problem to be solved.

SUMMARY

An embodiment of the present disclosure provides a system information receiving and sending method and apparatus, and a non-transitory computer-readable storage medium, which enable UE to receive system information even if the narrow band for broadcasting system information is different from the UE-specific narrow band for data transmission.

An embodiment of the present disclosure provides a method for receiving system information, which may include:
receiving system information (SI) reception indication information sent by a base station; and
receiving system information indicated by the SI reception indication information.

An embodiment of the present disclosure provides a method for sending system information, which may include:
sending system information (SI) reception indication information to a user equipment (UE); and
sending system information indicated by the SI reception indication information to the UE.

An embodiment of the present disclosure provides an apparatus for receiving system information, which may include a processor and a memory storing a computer program which, when executed by the processor, causes the processor to perform a method for receiving system information which may include: receiving system information (SI) reception indication information sent by a base station; and receiving system information indicated by the SI reception indication information.

An embodiment of the present disclosure provides an apparatus for sending system information, which may include a processor and a memory storing a computer program which, when executed by the processor, causes the processor to perform a method for sending system information which may include: sending system information (SI) reception indication information to a user equipment (UE); and sending system information indicated by the SI reception indication information to the UE.

An embodiment of the present disclosure provides a non-transitory computer-readable storage medium storing a computer program which, when executed by a processor, causes the processor to perform the method of any one of the above embodiments.

DETAILED DESCRIPTION

The embodiments of the present disclosure will be described below in combination with the accompanying drawings. Any combinations of embodiments and features of the embodiments of the present disclosure without conflict are possible.

When a public security event (such as earthquake and tsunami) occurs, the base station will send out a warning notice for the public security event through a paging message or Common Search Space type0 (CSS type0), and at the same time, the base station will broadcast the public security message in the system information. That is, after receiving the warning notice, the user equipment receives information in the system information which is related to public security.

For a legacy LTE terminal device, it is possible to monitor multiple narrow bands at the same time, that is, it is possible to monitor the narrow band for data transmission and the narrow band for system information broadcasting at the same time. However, in the Narrow Band Internet of Things (NB-IOT), enhanced Machine Type Communication (eMTC) and New Radio (NR) bandwidth reduced systems, since UE can only detect one narrow band at a time, after the public security warning notice is received, if the narrow band for broadcasting system information differs from the UE-specific narrow band for data transmission, reception of system information would be a problem, which is urgent to be solved.

An embodiment of the present disclosure provides a method for receiving system information, which enables reception of system information even if the narrow band for broadcasting system information is different from the UE-specific narrow band for data transmission.

Figure 1:
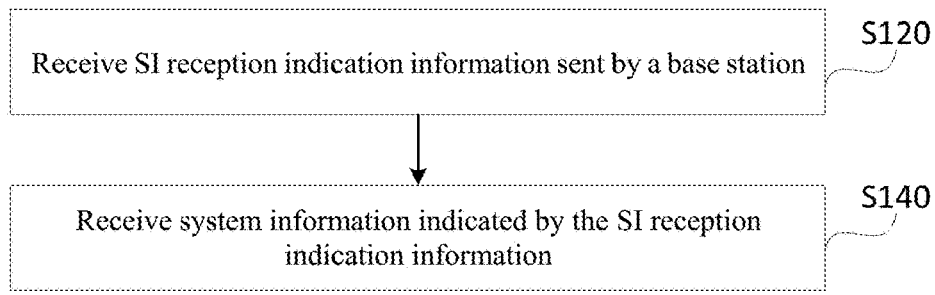
FIG. 1 is a flowchart of a method for receiving system information provided by an embodiment of the present disclosure.

In an example implementation, FIG. 1 is a flowchart of a method for receiving system information provided by an embodiment of the present disclosure. The present embodiment is applicable to the scenario of ensuring reception of system information in response to the narrow band for broadcasting system information being different from the UE-specific narrow band for data transmission. The present embodiment may be executed by user equipment. As shown in FIG. 1, the method provided by the present embodiment includes steps S120-S140.

At S120, SI reception indication information sent by a base station is received.

The SI reception indication information is an instruction message configured to instruct UE to receive system information. In an embodiment, the SI reception indication information may be information indicating the occurrence of a public security warning event or information indicating a change in the SI. In an embodiment, according to scheduling information for system information blocks (SIBs) in an MIB, the UE determines an SIB that has changed, that is, the SIB that has changed is not directly indicated in the SI reception indication information, while the scheduling information for the SIB s in the MIB is analyzed to determine the SIB that has changed. In an embodiment, the SIB that has changed is directly indicated in the SI reception indication information, for example, in response to the SI reception indication information indicating that SIB2 has changed, the SIB that has changed may be determined as SIB2 directly according to the SI reception indication information. In an embodiment, in response to the occurrence of a public security warning event, the SI reception indication information includes information about the public security warning event, that is, information about changes in SIB10 and SIB11.

At S140, system information indicated by the SI reception indication information is received.

In an embodiment, there is a correspondence between the SI reception indication information and the system information. After the UE receives the SI reception indication information, the system information indicated by the SI reception indication information may be obtained.

In an embodiment, after receiving system information (SI) reception indication information sent by a base station, the method further includes: stopping monitoring a physical downlink control channel (PDCCH) in a gap pre-configured by the base station in which the user equipment (UE) receives the SI.

In an embodiment, for legacy LTE UE, multiple narrow bands may be monitored at the same time, and even if the narrow band for broadcasting SI is different from the UE-specific narrow band for data transmission, both narrow bands may be monitored at the same time without having to consider how to receive system information in response to the narrow band for broadcasting system information being different from the UE-specific narrow band for data transmission.

However, for UE in NB-IOT, eMTC and NR bandwidth reduced systems, since only one narrow band can be detected, in order to accurately receive system information, a first Gap is configured before the system information is received; and in order to ensure the transmission of uplink information or downlink information after the reception of the system information is completed, a second Gap is configured after the system information is received. The length of the first Gap is an interval from the beginning of stopping monitoring the PDCCH to the start of an SI window; and the length of the second Gap is an interval from the end of the SI window to the beginning of resuming monitoring the PDCCH.

In an embodiment, a time duration for receiving the SI is set between the first Gap and the second Gap. Within the time duration for receiving the SI, the monitoring of the PDCCH is also stopped. In an embodiment, during the first Gap, the monitoring of the PDCCH is stopped, and switching is performed from a USS carrier to an SI carrier so as to prepare to receive the SI; then, at the end time of the first Gap, that is, at the start time of the SI window, the reception of the SI is started; then, at the start time of the second Gap, that is, at the end time of the SI window, the reception of the SI is finished; and then, during the second Gap, carrier switching is performed from the SI carrier to the USS carrier, and at the end time of the second Gap, the transmission of traffic data and signaling is started, thus realizing the reception of system information in response to the UE being in the connected state.

In an embodiment, the length of the first Gap and the length of the second Gap are both positive integers greater than or equal to 0, and the length of the first Gap and the length of the second Gap are both less than or equal to 40 milliseconds (ms). For example, the length of the first Gap is 1 ms, and the length of the second Gap is 4 ms; or, the length of the first Gap is 1 ms, and the length of the second Gap is 10 ms; or, different values are selected according to whether the traffic carrier and the SI transmission carrier are in the same narrow band. For example, in response to the traffic carrier and the SI transmission carrier being in the same narrow band, the length of the first Gap is 0, and the length of the second Gap is 0; and in response to the traffic carrier and the SI transmission carrier being in different narrow bands, the length of the first Gap may be 1 ms, and the length of the second Gap may be 3 ms.

In an embodiment, the UE first determines the starting position information for SI-Window of SIB10 and SIB11 according to the scheduling information for SIB10 and SIB11 in SIB1 in a master information block (MIB). For example, the length of the first Gap is 1 ms, that is, according to the scheduling information for SIB10 and SIB11, the UE starts the first Gap 1 ms before the starting position of the SI-Window and prepares to receive SI, that is, stopping the transmission of the traffic data 1 ms before the SI-Window; and the length of the second Gap is 3 ms, that is, according to the scheduling information for SIB10 and SIB11, the UE starts the second Gap 3 ms after the end position of the SI-Window, and starts the transmission of the traffic data accurately.

In an embodiment, within the duration of one SI window, no uplink or downlink transmission is performed. In response to the Uplink Grant (UL Grant) being in the duration of the SI window, the first Gap or the second Gap, the UE regards the UL Grant as an invalid resource. In an embodiment, in response to the UE initiating RRC connection re-establishment during the duration of the SI window, the first Gap or the second Gap, in order to ensure that the system information can be received in time, the UE will postpone the RRC connection re-establishment until after the duration of the second Gap. When setting a radio link failure (RLF) duration, the influence of the length of one SI window, the length of the first Gap, and the length of the second Gap may be considered. In response to the set duration of the SI window for receiving system information being relatively long, when setting the RLF duration, the duration of the SI window is not counted.

In an embodiment, after the UE receives the SI reception indication information, the UE is triggered to the SI carrier to start receiving the SI. A Gap timer of the base station is turned on in response to the base station starting to send the SI reception indication message for the first time; and after turning on the Gap timer, the base station stops the scheduling of all UE until the end of the Gap timer. Since the base station and the UE turn on the Gap timer asynchronously, after the Gap timer of the base station times out, when scheduling some of the UE, scheduling failures may also occur. This is because some of the UE is still receiving the SI on the SI carrier, or the Gap timer for some of the UE is still running, so the UE will not listen to the PDCCH on the data transmission carrier. In order to avoid the failure of the base station in scheduling UE, the timing of turning on the Gap timer may be set to sub-frame #0 of an infinite frame next to the infinite frame in which the base station detects the SI reception indication information, or the next sub-frame in the infinite frame in which the base station detects the SI reception indication information. The time duration of the Gap timer may be the interval between the start of the first Gap and the end of the second Gap; and it may also be a custom time interval.

In an embodiment, the first Gap and the second Gap take values in at least one of the following units: infinite frames, sub-frames, slots, symbols or milliseconds (ms). An infinite frame is the largest unit in the LTE time structure, with a duration of 10 milliseconds (ms), and one infinite frame consists of 10 sub-frames, each of which is 1 ms and numbered 0-9; and a sub-frame includes two slots, and each sub-frame contains at most 14 symbols. The first Gap and the second Gap may take values in any one of the following units: infinite frames, sub-frames, slots, symbols, and milliseconds. For example, the lengths of the first Gap and the second Gap may both be one or more infinite frames, or one or more sub-frames, or one or more slots, or one or more symbols, or one or more milliseconds, which is not limited.

In an embodiment, after receiving the system information indicated by the SI reception indication information, the method further includes: sending a scheduling request (SR) to the base station.

In an embodiment, after receiving the system information indicated by the SI reception indication information, the method further includes: initiating a physical random access channel (PRACH) random access process.

In an embodiment, after receiving the system information indicated by the SI reception indication information, the method further includes: sending uplink information carrying an SI acknowledge message to the base station.

In an embodiment, sending uplink information carrying an SI acknowledge message to the base station includes: sending a media access control (MAC) control element (CE) message and the uplink information which carry the SI acknowledge message to the base station via UL grant.

In an embodiment, after completing reception of the SI, the UE in an RRC connected state may multiplex the MAC CE message and the uplink information which carry the SI acknowledge message together and send them to the base station using the granted uplink scheduling resource. The uplink information may be uplink data or uplink signaling.

In an embodiment, after sending a scheduling request (SR) to the base station, the method further includes: sending, in response to detecting UL grant in the UE, an SI acknowledge message on an uplink channel indicated by the UL grant.

In an embodiment, after initiating a PRACH random access process, the method further includes: sending the SI acknowledge message on a third radio resource control (RRC) message Msg3 of the PRACH random access process.

In an embodiment, the SI acknowledge message is an MAC CE message, which contains indication information acknowledging reception of SI; or, the SI acknowledge message is an MAC sub-header, which contains indication information acknowledging reception of SI; or, the SI acknowledge message is an RRC message, which contains indication information acknowledging reception of SI.

In an embodiment, after the UE completes the reception of the SI, the SI acknowledge message may be fed back to the base station to enable the base station to confirm that the UE has successfully received the SI. In this scenario, the timing of turning on the gap timer may be set to sub-frame #0 of an infinite frame next to the infinite frame in which the base station detects the SI reception indication information, or it may also be set to the next sub-frame in the infinite frame in which the SI reception indication information is detected.

During the gap, if the UE completes the reception of the SI, it may feed back the SI acknowledge message to the base station. In an embodiment, an explicit acknowledgement method may be used in which, for example, an MAC CE message, an MAC sub-header or an RRC message may be used for acknowledgment.

In an embodiment, an MAC CE message is used for acknowledgement, where firstly, it is determined whether there is UL grant in the UE, and in response to there being UL grant in the UE, the UE may send an MAC CE message containing indication information acknowledging reception of SI on an uplink channel indicated by the UL grant. Before the UE feeds back the SI acknowledge message to the base station, the UE detects the PDCCH to determine whether there is UL grant. After the UE completes reception of the SI, PDCCH detection may be started in accordance with a preset detection timing, such as the next sub-frame, until the end of the gap. In response to a PDCCH being detected, the UE feeds back the SI acknowledge message to the base station. In response to there being no UL grant, the UE may send an SR to the base station to request scheduling resources to send the MAC CE message. After sending the SR, the UE starts to detect the PDCCH, and in response to no UL grant being detected within a preset time, the UE will continue to send the SR or initiate a PRACH random access process. In the process of initiating the PRACH random access process, the MAC CE message may be sent on the third RRC message of the PRACH random access process to complete the feedback of the SI acknowledge message. After the UE completes the feedback of the SI acknowledge message, the UE may switch back to the data transmission carrier and start transmission of data.

Table 1 is the format table of the sub-header in the MAC CE message. As shown in Table 1, the sub-header in the MAC CE message includes 8 bits, where the Logical Channel IDentity (LCID) occupies 5 bits. The LCID may be one of 01110, 01111 and 10001.

TABLE 1

The format table of the sub-header in the MAC CE message

| Reserved bit | Reserved bit | Extension | Logical channel identity |
| --- | --- | --- | --- |

The sub-header in the MAC CE message is an 8-bit message, which contains two 1-bit reserved bits (R), one 1-bit extension bit and one 5-bit LCID. In an embodiment, it is determined through the LCID whether the UE successfully receives the SI.

In an embodiment, the SI acknowledge message is determined by means of one of the following: a new logical channel identity (LCID) in an MAC sub-header, a reserved bit of an existing MAC CE message, or a new LCID in the existing MAC CE message, the new LCID being obtained by redefining or adding a function to an LCID in the existing MAC CE message.

In an embodiment, the new logical channel identity (LCID) in the MAC sub-header is used to determine the SI acknowledge message, which may directly adopt a structure of 0-bit MAC CE message, that is, it is indicated by one sub-header in the MAC CE message, while other bits in the MAC CE message are all 0.

In an embodiment, the reserved bits of the existing MAC CE message are used, that is, other reserved bits in the MAC CE message already defined are used to determine the SI acknowledge message. For example, the first bit and the second bit in the MAC CE message are idle, that is, both the first bit and the second bit are 0, then the first bit and the second bit may be used to redefine the SI acknowledge message. For example, when the first bit and the second bit in the reserved bits in the MAC CE message are redefined as 01, it indicates that the UE has received the SI. The reserved bits are not reserved bits in the sub-header of the MAC CE message.

In an embodiment, the new LCID in the existing MAC CE message is used to indicate whether the UE has received the SI, that is, the function represented by the LCID in the existing MAC CE message is redefined or a new function is added. For example, LCID0 represents function A, in which case, the function of LCID0 may be changed to function B, or the function of LCID0 may be set to function A and function B on the basis of function A.

The LCID may be used to indicate whether the UE has successfully received the SI, or whether the UE has successfully received the SI reception indication information, as well as to indicate whether the UE is released to the idle state. The way of setting the LCID to indicate whether the UE has successfully received the SI reception indication information and whether the UE is released to the idle state is the same as the way of setting the LCID to indicate whether the UE has successfully received the SI, and the three ways in the above embodiments may also be adopted, which will not be described in detail here.

In an embodiment, it is also possible to acknowledge, through an RRC message, whether the UE has received the SI. The SI acknowledge message may be an RRC message. When using an RRC message to acknowledge whether the UE has received the SI, it is necessary to first determine whether there is UL grant in the UE. In an embodiment, there is UL grant in the UE, then the UE feeds back an RRC message to the base station using the UL grant, where the RRC message contains indication information acknowledging reception of SI. In an embodiment, there is no UL grant in the UE, then the UE sends an SR to the base station to request scheduling a resource to send an RRC message, and after the UE sends the SR to the base station, the UE starts to detect a PDCCH; and in response to no UL grant being detected within a preset time, the UE continues to send the SR or initiates a connected-state PRACH random access process, and sends the RRC message on the third RRC message Msg3 of the PRACH random access process, the RRC message containing the indication information acknowledging reception of SI, so as to complete the feedback of the SI acknowledge message. After the UE completes the feedback of the SI acknowledge message, the UE may switch back to the data transmission carrier and start the transmission of data.

In an embodiment, the UE may feed back the indication information acknowledging reception of SI to the base station by means of an implicit acknowledgement method. Within a predefined duration after the time duration of one SI reception, or after the end of the time duration of one SI reception, an implicit acknowledgement timer is started, and it may be considered that the UE has successfully received the SI in response to the predefined duration being exceeded or the timer timing out.

In an embodiment, after all the UE have completed the acknowledgement of reception of the SI, the base station may stop sending the SI reception indication information. After one UE has completed the acknowledgement of reception of the SI, the UE may go to a UE Search Space (USS) carrier. After the UE feeds back the acknowledgement of reception of the SI to the base station, the base station may confirm that the UE has completed reception of the SI and has switched back to the data transmission carrier, at which time the base station may start scheduling the UE.

In an embodiment, after the UE completes the reception of the SI reception indication information, it may feed back an acknowledge message for the SI reception indication information to the base station. The acknowledge message for the SI reception indication information may be fed back to the base station by means of an explicit acknowledgement method, or by means of an implicit acknowledgement method.

In an embodiment, an MAC CE message is used to acknowledge whether the UE has received the SI reception indication information. Firstly, it is determined whether there is UL grant in the UE, and in response to there being UL grant in the UE, the UE may send an MAC CE message containing indication information acknowledging reception of SI on an uplink channel indicated by the UL grant. Before the UE feeds back the acknowledge message for the SI reception indication information to the base station, the UE detects the PDCCH to determine whether there is UL grant. After the UE completes the reception of the SI reception indication information, PDCCH detection may be started in accordance with a preset detection timing, such as the next sub-frame, until the end of the gap. In response to UL grant being detected, the UE feeds back the acknowledge message for the SI reception indication information to the base station. In response to there being no UL grant, the UE may send an SR to the base station to request scheduling a resource to send the MAC CE message containing the acknowledgement of reception of the SI reception indication information. After sending the SR, the UE starts to detect a PDCCH, and in response to no UL grant being detected within a preset time, the UE will continue to send the SR or initiate a PRACH random access process. In the process of initiating the PRACH random access process, the MAC CE message containing the acknowledgement of reception of the SI reception indication information may be sent on the third RRC message of the PRACH random access process to complete the feedback of reception of the SI reception indication information. After the UE completes the feedback of the acknowledge message corresponding to the SI reception indication information, the UE turns on the first Gap to prepare to start receiving the SI. The timing for the UE to turn on the first Gap may be set to the first sub-frame after the end of one SI window is detected or sub-frame #0 of the next infinite frame.

The UE feeds back the format of the sub-header of the MAC CE message that contains the acknowledge message for reception of the SI reception indication information to the base station, which is shown in Table 1 in the above embodiment. The LCID in the sub-header of the MAC CE message that contains the acknowledge message for reception of the SI reception indication information is different from the LCID in the sub-header of the MAC CE message that contains the SI acknowledge message. For example, in response to the LCID in the sub-header of the MAC CE message that contains the SI acknowledge message being 10001, the LCID in the sub-header of the MAC CE message that contains the acknowledge message for reception of the SI reception indication information can only be 01110 or 01111.

In an embodiment, it is also possible to acknowledge, through an RRC message, whether the UE has received the SI reception indication information. The acknowledge message for the SI reception indication information may be an RRC message. When using an RRC message to acknowledge whether the UE has received the SI reception indication information, it is necessary to first determine whether there is UL grant in the UE. In an embodiment, there is UL grant in the UE, then the UE feeds back an RRC message to the base station using the UL grant, where the RRC message contains acknowledgement information indicating that the UE has received the SI reception indication information. In an embodiment, there is no UL grant in the UE, then the UE sends an SR to the base station to request scheduling a resource to send an RRC message, and after the UE sends the SR to the base station, the UE starts to detect a PDCCH; and in response to no UL grant being detected within a preset time, the UE continues to send the SR or initiates a connected-state PRACH random access process, and sends the RRC message on the third RRC message Msg3 of the PRACH random access process, the RRC message containing the acknowledge message for reception of the SI reception indication information, so as to complete the feedback of the acknowledge message corresponding to the SI reception indication information. After the UE completes the feedback of the acknowledge message corresponding to the SI reception indication information, the UE starts the first Gap to prepare to start receiving the SI.

In an embodiment, the UE may feed back the acknowledge message for acknowledging reception of the SI reception indication information to the base station by means of an implicit acknowledgement method. After the end of the duration of the second Gap, an implicit acknowledgement timer is turned on within a predefined duration after the second Gap or at the same time as the end of the second Gap, and it may be considered that the UE has successfully received the acknowledge message for the SI reception indication information in response to the predefined duration being exceeded or the timer timing out.

In an embodiment, upon reception of the SI reception indication information by the UE, for the UE with dual-narrow band reception capabilities, the dual-narrow band reception mode will be turned on, and the scheduling of the UE by the base station will not be affected, that is, the time when the UE turns on the dual-narrow band reception mode is determined by the UE, while the base station may pay no attention to the time when the UE starts the dual-narrow band reception mode. In order to save energy, after the UE completes reception of the public security system information, the UE may turn off the dual-narrow band reception mode.

In an embodiment, after receiving the system information indicated by the SI reception indication information, the method further includes: releasing an RRC connection and entering an idle state.

In an embodiment, after the UE receives the SI reception indication information, the UE may independently release the RRC connection and enter the idle state; and may also release the RRC connection autonomously and perform release acknowledgement.

In an embodiment, releasing an RRC connection and entering an idle state includes: releasing the RRC connection immediately and entering the idle state after receiving the SI reception indication information sent by the base station.

In an embodiment, releasing an RRC connection and entering an idle state includes: after receiving the SI reception indication information sent by the base station, determining whether there is uplink traffic according to the UE state; and releasing the RRC connection immediately and entering the idle state in response to there being no uplink traffic.

In an embodiment, after receiving the SI reception indication information sent by the base station, it is determined whether there is uplink traffic based on the state of the UE, and in response to there being no uplink traffic, the RRC connection is immediately released and the UE enters the idle state. After the base station sends the SI reception indication information, in response to discovering that the UE has no uplink traffic and the base station is conducting downlink scheduling, the base station will stop the downlink scheduling of the UE and prepare to release the UE, and it is considered that the UE will release the RRC connection to the idle state autonomously.

In an embodiment, releasing an RRC connection and entering an idle state includes: releasing the RRC connection and entering the idle state in response to a reception of a release request sent by the base station, the release request including: a reason for release, which is a change in the SI, or the occurrence of a warning event.

In an embodiment, in response to a change in the SI or the occurrence of a warning event, the base station will trigger the UE's release of an RRC connection and its entering into the idle state. In an embodiment, in response to a change in the SI or the occurrence of a warning event, the base station sends a release request carrying the reason for release to the UE, and after receiving the release request, the UE releases the RRC connection and enters the idle state. For the explanation of the change in the SI or the occurrence of a warning event, reference may be made to the description of the above embodiments.

In an embodiment, releasing an RRC connection and entering an idle state includes: after the UE feeds back the acknowledge message corresponding to the SI reception indication information to the base station, releasing the RRC connection and entering the idle state.

In an embodiment, releasing an RRC connection and entering an idle state includes: detecting a physical downlink control channel (PDCCH) within a preset first duration; and releasing the RRC connection and entering the idle state in response to no PDCCH being detected.

In an embodiment, releasing an RRC connection and entering an idle state includes: detecting a physical downlink control channel (PDCCH) within a preset first duration; and in response to UL grant being detected, feeding back, by the UE, the acknowledge message for reception of the SI reception indication information to the base station on the uplink channel indicated by UL Grant; and detecting the PDCCH within a preset second duration; and releasing the RRC connection and entering the idle state in response to no PDCCH being detected.

In an embodiment, the setting of the first duration and the second duration may be the same or different, which is not limited.

In an embodiment, after the UE receives the SI reception indication information, it may directly release the RRC connection and enter the idle state. At the same time, the UE does not feed back release acknowledgement information to the base station. The base station keeps sending the SI reception indication information on CSS type0 and the base station does not schedule any UE on the USS.

In an embodiment, after receiving the SI reception indication information, the UE releases the RRC connection and performs release acknowledgement. In an embodiment, an MAC CE message may be used for release acknowledgement; and in an embodiment, an RRC message may also be used for release acknowledgement.

In an embodiment, an MAC CE message is used for release acknowledgement. Firstly, it is determined whether there is UL grant in the UE, and in response to there being no UL grant, the UE sends an SR to the base station to request UL grant for sending the MAC CE message. The format of the sub-header in the MAC CE message is as shown in Table 1 in the above embodiment. The LCID of the sub-header in the MAC CE message that contains the release acknowledgement message is different from the LCID of the sub-header in the MAC CE message that contains the SI acknowledge message. For example, in response to the LCID of the sub-header in the MAC CE message that contains the SI acknowledge message being 10001, and the LCID of the sub-header in the MAC CE message that contains the acknowledge message for the reception of the SI reception indication information being 01110, the LCID of the sub-header in the MAC CE message that contains the release acknowledgement message can only be 01111. There is no restriction in this respect, as long as the LCID of the sub-header in the MAC CE message that contains the SI acknowledge message, the LCID of the sub-header in the MAC CE message that contains the acknowledge message for reception of the SI reception indication information, and the LCID of the sub-header in the MAC CE message that contains the release acknowledgement message are not the same.

In an embodiment, an RRC message is used for release acknowledgement. Firstly, it is determined whether there is UL grant in the UE, and in response to there being no UL grant in the UE, the UE sends an SR to the base station to request UL grant for sending the RRC message. The RRC message is indication information that contains the acknowledgement of reception of the SI reception indication information and the immediate release to the idle state. After all the UE have completed the release acknowledgement of RRC connection, the base station stops sending the SI reception indication information. In response to the base station not receiving the release acknowledgement information from the UE, the base station continues to not schedule the UE on the USS carrier.

In an embodiment, after the UE receives the SI reception indication information, the base station will trigger the UE's release of the RRC connection and its release to the idle state, and contain a reason for release in the RRC connection release request, where the reason for release may be ETWS warning information.

Figure 2:
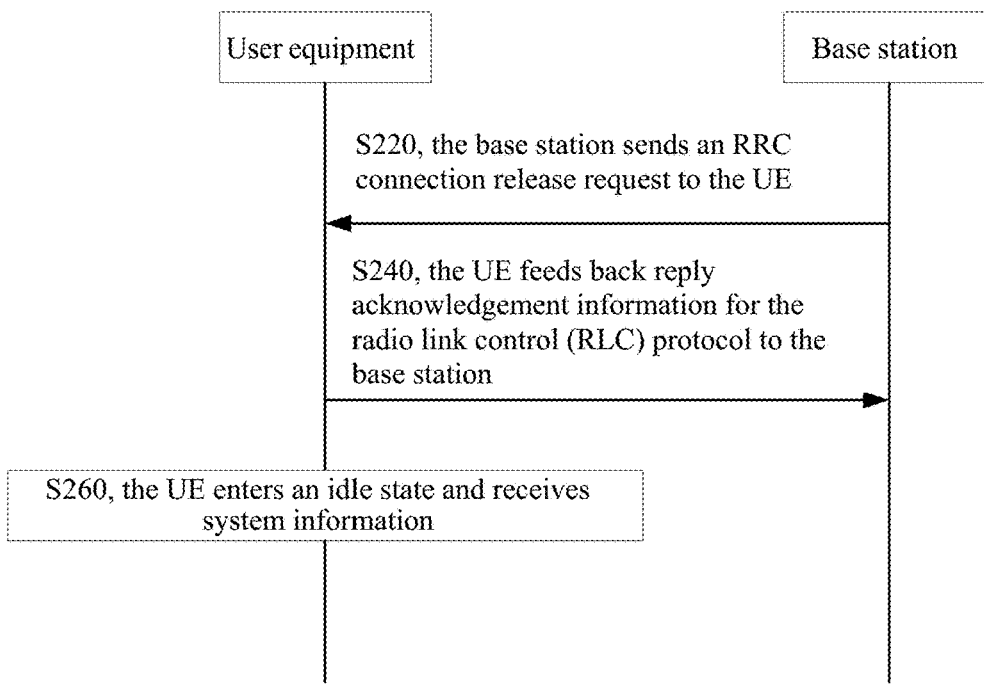
FIG. 2 is a flowchart of triggering the UE's release of an RRC connection by a base station provided by an embodiment of the present disclosure.

FIG. 2 is a flowchart of triggering the UE's release of an RRC connection by a base station provided by an embodiment of the present disclosure. As shown in FIG. 2, the method in the present embodiment includes steps S220-S260.

At S220, the base station sends an RRC connection release request to the UE.

At S240, the UE feeds back reply acknowledgement information for the radio link control (RLC) protocol to the base station.

At S260, the UE enters an idle state and receives system information.

In an embodiment, the base station sends the RRC connection release request to the UE and contains the reason for release in the RRC connection release request, and the reason for release may be ETWS warning information, and may also be information indicating that the SI has changed. After the UE has received the RRC connection release request sent by the base station, the UE provides feedback for it, that is, it feeds back Radio Link Control (RLC) Acknowledge Character (ACK) information. Then, the UE releases the RRC connection, enters the idle state, and starts to receive public security system information.

In an embodiment, receiving system information indicated by the SI reception indication information includes: receiving, by the UE, the system information indicated by the SI reception indication information only once in response to a reception of multiple pieces of identical SI reception indication information within a preset third duration; or ignoring, after receiving the SI reception indication information, the system information indicated by the SI reception indication information in response to a reception of identical SI reception indication information again within a preset fourth duration.

In an embodiment, the third duration may be the duration in which the UE receives the SI, that is, the third duration may be the duration of the gap. The fourth duration is a preset duration after the UE receives the SI reception indication information, i.e., the duration of the fourth duration is less than the duration of the gap.

In an embodiment, after the base station sends the SI reception indication information (e.g., public security warning information) for the first time, it turns on the timer for the sending of this warning, and before the timer times out, the base station only processes the sending of this warning. For the UE, after warning information is listened to once, a timer for reception of that warning is turned on, and until that timer times out, any warning received is considered as this warning. Before the timer times out, the UE does not receive the public security warning information repeatedly, nor does it receive public security SI repeatedly.

Due to the differences among multiple UE, the differences in reception performance are also large for different UE. One or more UE turn on the timer for the sending of a new warning at different timings and also at different timings than the timing when the base station turns on this timer, so it may happen that the timer on the base station side has timed out and at the same time a new warning needs to be sent, in which case the base station will start sending new warning information, but since the timer for the UE is still running, the new warning information will not be listened to, and even if it is listened to, it will be considered as the previous warning information. This may cause some of the UE to miss this warning information. However, since the frequency of warning events is very low, the timer duration may be set longer so that some of the UE can avoid missing the reception of the new warning information.

In an embodiment, receiving SI reception indication information sent by a base station includes: transmitting the SI reception indication information on a PDCCH in a common search space (CSS), the PDCCH carrying scheduling information for the SI indicated by the SI reception indication information.

In an embodiment, the transmission may be performed by means of a combination of semi-static scheduling of the SI and dynamic scheduling of the SI.

In an embodiment, by means of dynamic scheduling of the SI, the reception of the SI and the scheduling information related to the SI is indicated in the PDCCH of the CSS, the scheduling information containing: whether there is transmission of system information, and the start sub-frame of the system information transmission window and the window length, or the start and end sub-frames of the system information, or the time domain offset from the end of the CSS to the scheduling of the system information.

In an embodiment, the public security warning information and the scheduling information related to SIB10 and SIB11 are indicated in downlink control information (DCI) of CSS type 0. The scheduling information includes whether there is transmission of SIB10 and SIB11; and the start sub-frame of the transmission window of SIB10 and SIB11 and the window length, or the start sub-frame and end sub-frame of SIB10 and SIB11. For UE on a carrier, after listening to the public security warning information and the related scheduling information, it will receive the SI at the scheduling position of SIB 10 and SIB11 on the carrier.

In an embodiment, the base station uses CSS type 0 to send the public security warning information, and in addition, broadcasts the scheduling timing of SIB 10 and SIB 11 in a broadcast message, i.e., broadcasts the value of the time domain offset from the end of CSS type 0 to the start of scheduling SIB 10 and SIB 11. After listening to the public warning information on this carrier, the UE may then detect the reception of SIB10 and SIB11 at the corresponding position based on the value of the time domain offset between the broadcasted scheduling timing of SIB10 and SIB11 and the CSS.

In an embodiment, the combination of semi-static scheduling and dynamic scheduling means that: the semi-static scheduling of information is to predefine the time domain and frequency domain position information for scheduling of system information, for example, the values of the time-domain and frequency-domain offsets of this time domain and frequency domain position information relative to the CSS may be predefined, and the reception of the system information may be dynamically indicate in the PDCCH of the CSS; and after receiving the indication information, the system information may be received in accordance with the predefined scheduling information.

In an embodiment, the base station uses CSS type 0 to send the public security warning information, and may predefine the value of the time domain offset between the scheduling timing of SIB10 and SIB11 and CSS type 0. After listening to the warning information on this carrier, the UE may then detect the reception of SIB10 and SIB11 at the corresponding position based on the value of the time domain offset between the system-predefined scheduling timing of SIB10 and SIB11 and the CSS.

For UE in the Legacy mode, after the base station uses Paging (carrying public security warning information) to send the warning information, the base station updates the system information related to public security and completes broadcasting in the cell, and after receiving the warning information, the UE receives the SIB1 message and acquires the scheduling information related to SIB10 and SIB11, and then receives the SIB10 and SIB11 messages.

Figure 3:
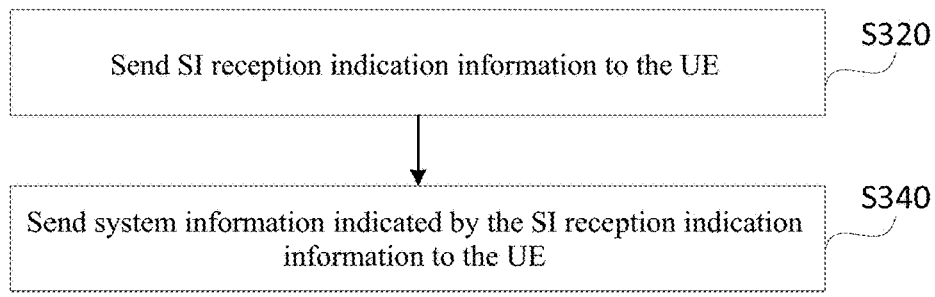
FIG. 3 is a flowchart of a method for sending system information provided by an embodiment of the present disclosure.

FIG. 3 is a flowchart of a method for sending system information provided by an embodiment of the present disclosure. The present embodiment is applicable to the scenario of ensuring that the system information sent by the base station can be received by the UE in response to the narrow band for broadcasting system information being different from the UE-specific narrow band for data transmission. The present embodiment may be executed by the base station. As shown in FIG. 3, the method includes the following steps:

At S320, SI reception indication information is sent to UE.

The SI reception indication information is configured to instruct the UE to start receiving system information. In an embodiment, the SI reception indication information may be public security warning information, or a message indicating a change in the SI.

At S340, system information indicated by the SI reception indication information is sent to the UE.

In an embodiment, after the base station sends the SI reception indication information to the UE, the base station continues to send system information corresponding to the SI reception indication information to the UE.

In an embodiment, sending system information indicated by the SI reception indication information to the UE includes: stopping sending downlink information in a gap pre-configured by a base station in which the user equipment (UE) receives the SI.

In an embodiment, the gap in which the UE receives the SI includes a first Gap and a second Gap. The length of the first Gap is an interval from the beginning of stopping monitoring the PDCCH to the start of an SI window; and the length of the second Gap is an interval from the end of the SI window to the beginning of resuming monitoring the PDCCH.

In an embodiment, the first Gap and the second Gap take values in at least one of the following units: infinite frames, sub-frames, slots, symbols or milliseconds (ms).

In an embodiment, when the base station sends the SI reception indication information to the UE, in order to ensure that only one narrow band UE can be monitored, it may switch to the SI carrier to receive the system information corresponding to the SI reception indication information, and configure the gap in which the UE receives SI before the base station sends the SI reception indication information to the UE. Reference can be made to the description of the above embodiments for the way of configuring the gap in which the UE receives the SI, which will not be described in detail here.

In an embodiment, sending system information indicated by the SI reception indication information to the UE further includes: receiving a scheduling request (SR) sent by the UE.

In an embodiment, sending system information indicated by the SI reception indication information to the UE further includes: sending UL Grant to schedule uplink information transmission.

In an embodiment, sending system information indicated by the SI reception indication information to the UE further includes: participating in a PRACH random access process initiated by the UE.

In an embodiment, before the UE feeds back the SI confirmation information to the base station, it is determined whether there is UL grant is the UE, and in response to there being no UL grant in the UE, the UE sends an SR to the base station to request UL grant. From the perspective of the base station side, in response to there being no UL grant in the UE, the base station receives the SR sent by the UE and allocates UL grant to the UE according to the SR. When the base station does not successfully allocate the UL grant to the UE, the UE may continue to send the SR or initiate the PRACH random access process. From the perspective of the base station side, the base station participates in the PRACH random access process initiated by the UE. For the explanation of the SR sent by the UE or the PRACH random access process initiated by the UE, reference can be made to the description of the SR sent or the PRACH random access process initiated by UE in the above embodiments, which will not be described in detail here.

In an embodiment, after receiving the SR sent by the UE, the method further includes: in response to the base station sending a PDCCH carrying UL grant, receiving, on an uplink channel indicated by the UL Grant, an SI acknowledge message fed back by the UE.

In an embodiment, after sending UL Grant to schedule uplink information transmission, the method further includes: receiving, on an uplink channel indicated by the UL Grant, an SI acknowledge message fed back by the UE.

In an embodiment, receiving, on an uplink channel indicated by the UL Grant, an SI acknowledge message fed back by the UE includes: receiving, on the uplink channel indicated by the UL Grant, an MAC CE message and uplink information which carry the SI acknowledge message.

In an embodiment, after completing reception of the SI, the UE in an RRC connected state may multiplex the MAC CE message and the uplink information which carry the SI acknowledge message together and send them to the base station using the UL grant, so as to enable the base station to receive, on the uplink channel indicated by the UL grant, the MAC CE message and the uplink information which carry the SI acknowledge message.

In an embodiment, after participating in the PRACH random access process initiated by the UE, the method further includes: receiving the SI acknowledge message on Msg3 of the PRACH random access process.

In an embodiment, the SI acknowledge message is an MAC CE message, which contains indication information acknowledging reception of SI; or, the SI acknowledge message is an MAC sub-header, which contains indication information acknowledging reception of SI; or, the SI acknowledge message is an RRC message, which contains indication information acknowledging reception of SI.

In an embodiment, the SI acknowledge message is determined by means of one of the following: a new logical channel identity (LCID) in an MAC sub-header, a reserved bit of an existing MAC CE message, or a new LCID in the existing MAC CE message, the new LCID being obtained by redefining or adding a function to an LCID in the existing MAC CE message.

In an embodiment, sending system information indicated by the SI reception indication information to the UE further includes: sending a release request to the UE, the release request being configured to trigger the UE's release of an RRC connection, and the release request including: a reason for release, which is a change in the SI, or the occurrence of a warning event.

In an embodiment, in response to there being UL grant in the UE or a PRACH random access process being initiated by the UE, the UE may feed back the SI acknowledge message to the base station through the UL grant, or send the SI acknowledge message on the third RRC message Msg3 of the PRACH random access process. From the perspective of the base station side, in response to the base station sending a PDCCH carrying UL grant, an SI acknowledge message fed back by the UE may be received on an uplink channel indicated by the UL Grant. The SI acknowledge message may also be received on Msg3 of the PRACH random access process. The SI acknowledge message may be an MAC CE message or an RRC message. For the description of whether the SI acknowledge message is an MAC CE message or an RRC message, reference may be made to the description of the MAC CE message and the RRC message in the above embodiments, which will not be described in detail here.

In an embodiment, sending system information indicated by the SI reception indication information to the UE further includes: receiving an acknowledge message for release to idle state which is fed back by the UE.

In an embodiment, receiving an acknowledge message for release to idle state which is fed back by the UE includes: after sending the SI reception indication information to the UE, receiving the acknowledge message for release to idle state which is fed back by the UE.

In an embodiment, in response to the UE not needing to send the acknowledge message corresponding to the SI reception indication information, after the UE receives the SI reception indication information, the UE may then immediately release the RRC connection and enter the idle state. From the perspective of the base station side, after sending the SI reception indication information to the UE, it may then receive the acknowledge message for release to idle state which is fed back by the UE.

In an embodiment, receiving an acknowledge message for release to idle state which is fed back by the UE includes: after receiving the acknowledge message corresponding to the SI reception indication information which is fed back by the UE, receiving the acknowledge message for release to idle state which is fed back by the UE.

In an embodiment, in response to the UE needing to send an acknowledge message corresponding to the SI reception indication information, after the UE feeds back the acknowledge message corresponding to the SI reception indication information to the base station, the UE releases the RRC connection and enters the idle state, and feeds back the acknowledge message for release to idle state to the base station.

In an embodiment, sending the SI reception indication information to the UE includes: transmitting the SI reception indication information on a PDCCH in a CSS, the PDCCH carrying scheduling information for the SI indicated by the SI reception indication information.

In an embodiment, the SI may be received and scheduled by means of a combination of dynamic scheduling, semi-static scheduling, and dynamic scheduling. For the explanation of the combination of dynamic scheduling, semi-static scheduling, and dynamic scheduling, reference may be made to the description of the above embodiments, and will not be described in detail here.

Figure 4:
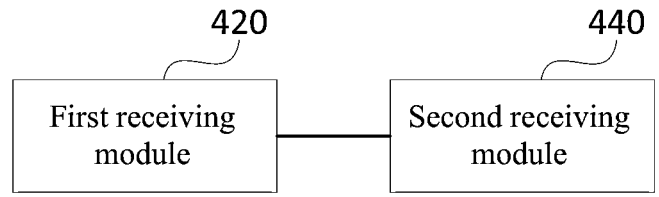
FIG. 4 is a structural block diagram of an apparatus for receiving system information provided by an embodiment of the present disclosure.

FIG. 4 is a structural block diagram of an apparatus for receiving system information provided by an embodiment of the present disclosure. As shown in FIG. 4, the apparatus for receiving system information provided in the present embodiment includes a first receiving module 420 and a second receiving module 440, where the first receiving module 420 is configured to receive system information (SI) reception indication information sent by a base station; and the second receiving module 440 is configured to receive system information indicated by the SI reception indication information.

The apparatus for receiving system information provided in the present embodiment is configured to implement the method for receiving system information of the embodiment shown in FIG. 1, and the implementation principle and technical effect of the apparatus for receiving system information provided in the present embodiment are similar, which will not be described in detail here.

In an embodiment, the apparatus for receiving system information further includes: a stop monitoring module configured to: after receiving the system information (SI) reception indication information sent by the base station, stop monitoring a physical downlink control channel (PDCCH) in a gap pre-configured by the base station in which user equipment (UE) receives the SI.

In an embodiment, the gap in which the UE receives the SI includes a first Gap and a second Gap. The length of the first Gap is an interval from the beginning of stopping monitoring the PDCCH to the start of an SI window; and the length of the second Gap is an interval from the end of the SI window to the beginning of resuming monitoring the PDCCH.

In an embodiment, the first Gap and the second Gap take values in at least one of the following units: infinite frames, sub-frames, slots, symbols or milliseconds (ms).

In an embodiment, the apparatus for receiving system information further includes: a third sending module configured to send a scheduling request (SR) to the base station after receiving the system information indicated by the SI reception indication information.

In an embodiment, the apparatus for receiving system information further includes: an initiation module configured to initiate a physical random access channel (PRACH) random access process after receiving the system information indicated by the SI reception indication information.

In an embodiment, the apparatus for receiving system information further includes: a fourth sending module configured to send uplink information that carries the SI acknowledge message to the base station after receiving the system information indicated by the SI reception indication information.

In an embodiment, the apparatus for receiving system information further includes: a fifth sending module configured to send, in response to detecting UL grant in the UE, an SI acknowledge message on an uplink channel indicated by the UL grant after sending the scheduling request (SR) to the base station.

In an embodiment, the apparatus for receiving system information further includes: a sixth sending module configured to: send, after initiating the PRACH random access process, the SI acknowledge message on the third RRC message Msg3 of the PRACH random access process.

In an embodiment, the fourth sending module is configured to: send an MAC CE message and uplink information which carry the SI acknowledge message to the base station via the UL grant.

In an embodiment, the SI acknowledge message is an MAC CE message, which contains indication information acknowledging reception of SI; or, the SI acknowledge message is an MAC sub-header, which contains indication information acknowledging reception of SI; or, the SI acknowledge message is an RRC message, which contains indication information acknowledging reception of SI.

In an embodiment, the SI acknowledge message is determined by means of one of the following: a new logical channel identity (LCID) in an MAC sub-header, a reserved bit of an existing MAC CE message, or a new LCID in the existing MAC CE message, the new LCID being obtained by redefining or adding a function to an LCID in the existing MAC CE message.

In an embodiment, the apparatus for receiving system information further includes: a release module configured to release the RRC connection and enter the idle state after receiving the system information indicated by the SI reception indication information.

In an embodiment, the release module is configured to: release the RRC connection immediately and enter the idle state after receiving the SI reception indication information sent by the base station.

In an embodiment, the release module is configured to: after receiving the SI reception indication information sent by the base station, determine whether there is uplink traffic according to the UE state; and release the RRC connection immediately and enter the idle state in response to there being no uplink traffic.

In an embodiment, the release module is configured to: release the RRC connection and enter the idle state in response to a reception of a release request sent by the base station, the release request including: a reason for release, which is a change in the SI, or the occurrence of a warning event.

In an embodiment, the release module is configured to: after the UE feeds back the acknowledge message corresponding to the SI reception indication information to the base station, release the RRC connection and enter the idle state.

In an embodiment, the release module is configured to: detect a physical downlink control channel (PDCCH) within a preset first duration; and release the RRC connection and enter the idle state in response to no PDCCH being detected.

In an embodiment, the release module is configured to: detect a physical downlink control channel (PDCCH) within a preset first duration; and in response to UL grant being detected, feed back, by the UE, the acknowledge message for reception of the SI reception indication information to the base station on the uplink channel indicated by UL Grant; and detect the PDCCH within a preset second duration; and release the RRC connection and enter the idle state in response to no PDCCH being detected.

In an embodiment, the second receiving module includes: a receiving unit configured to receive, by the UE, the system information indicated by the SI reception indication information only once in response to a reception of multiple pieces of identical SI reception indication information within a preset third duration; or an ignoring unit configured to ignore, after receiving the SI reception indication information, the system information indicated by the system information reception indication information in response to a reception of identical SI reception indication information again within a preset fourth duration.

In an embodiment, the SI reception indication information is transmitted on a PDCCH in a common search space (CSS), the PDCCH carrying scheduling information for the SI indicated by the SI reception indication information.

Figure 5:
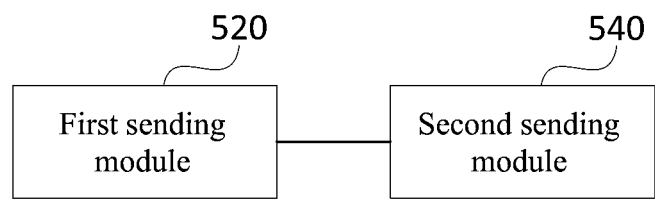
FIG. 5 is a structural block diagram of an apparatus for sending system information provided by an embodiment of the present disclosure.

FIG. 5 is a structural block diagram of an apparatus for sending system information provided by an embodiment of the present disclosure. As shown in FIG. 5, the apparatus for sending system information provided by the present embodiment includes a first sending module 520 and a second sending module 540, where the first sending module 520 is configured to send system information (SI) reception indication information to a user equipment (UE); and the second sending module 540 is configured to send system information indicated by the SI reception indication information to the UE.

The apparatus for sending system information provided in the present embodiment is configured to implement the method for sending system information of the embodiment shown in FIG. 2, and the implementation principle and technical effect of the apparatus for sending system information provided in the present embodiment are similar, which will not be described in detail here.

In an embodiment, the apparatus for sending system information further includes: a stop sending module configured to: after sending the system information (SI) reception indication information to the user equipment (UE), stop sending downlink information in a gap pre-configured by a base station in which the user equipment (UE) receives the SI.

In an embodiment, the Gap in which the UE receives the SI includes a first Gap and a second Gap. The length of the first Gap is an interval from the beginning of stopping monitoring the PDCCH to the start of an SI window; and the length of the second Gap is an interval from the end of the SI window to the beginning of resuming monitoring the PDCCH.

In an embodiment, the first Gap and the second Gap take values in at least one of the following units: infinite frames, sub-frames, slots, symbols or milliseconds (ms).

In an embodiment, the apparatus for sending system information further includes: a third receiving module configured to receive, after sending system information indicated by the SI reception indication information to the UE, a scheduling request (SR) sent by the UE.

In an embodiment, the apparatus for sending system information further includes: a third sending module configured to: send, after sending the system information indicated by the SI reception indication information to the UE, UL Grant to schedule uplink information transmission.

In an embodiment, the apparatus for sending system information further includes: a participation initiation module configured to participate, after sending the system information indicated by the SI reception indication information to the UE, in a PRACH random access process initiated by the UE.

In an embodiment, the apparatus for sending system information further includes: a fourth receiving module configured to, after receiving the SR sent by the UE and in response to the base station sending a PDCCH carrying UL Grant, receive on an uplink channel indicated by the UL grant, an SI acknowledge message fed back by the UE.

In an embodiment, the apparatus for sending system information further includes: a fifth receiving module configured to: after sending the UL Grant to schedule uplink information transmission, receive, on the uplink channel indicated by the UL Grant, the SI acknowledge message fed back by the UE.

In an embodiment, a fifth receiving module configured to: receive, on the uplink channel indicated by the UL Grant, an MAC CE message and uplink information which carry the SI acknowledge message.

In an embodiment, a sixth receiving module configured to: receive, after participating in the PRACH random access process initiated by the UE, the SI acknowledge message on Msg3 of the PRACH random access process.

In an embodiment, the SI acknowledge message is an MAC CE message, which contains indication information acknowledging reception of SI; or, the SI acknowledge message is an MAC sub-header, which contains indication information acknowledging reception of SI; or, the SI acknowledge message is an RRC message, which contains indication information acknowledging reception of SI.

In an embodiment, the SI acknowledge message is determined by means of one of the following: a new logical channel identity (LCID) in an MAC sub-header, a reserved bit of an existing MAC CE message, or a new LCID in the existing MAC CE message, the new LCID being obtained by redefining or adding a function to an LCID in the existing MAC CE message.

In an embodiment, the apparatus for sending system information further includes: a fourth sending module configured to: send a release request to the UE after sending the system information indicated by the SI reception indication information to the UE, the release request being configured to trigger the UE's release of an RRC connection, and the release request including: a reason for release, which is a change in the SI, or the occurrence of a warning event.

In an embodiment, the apparatus for sending system information further includes: a seventh receiving module configured to receive, after sending the system information indicated by the SI reception indication information to the UE, an acknowledge message for release to idle state which is fed back by the UE.

In an embodiment, the seventh receiving module is configured to: after sending the SI reception indication information to the UE, receive the acknowledge message for release to idle state which is fed back by the UE.

In an embodiment, the seventh receiving module is configured to: after receiving the acknowledge message corresponding to the SI reception indication information which is fed back by the UE, receive the acknowledge message for release to idle state which is fed back by the UE.

In an embodiment, the SI reception indication information is transmitted on a PDCCH in a CSS, the PDCCH carrying scheduling information for the SI indicated by the SI reception indication information.

Figure 6:
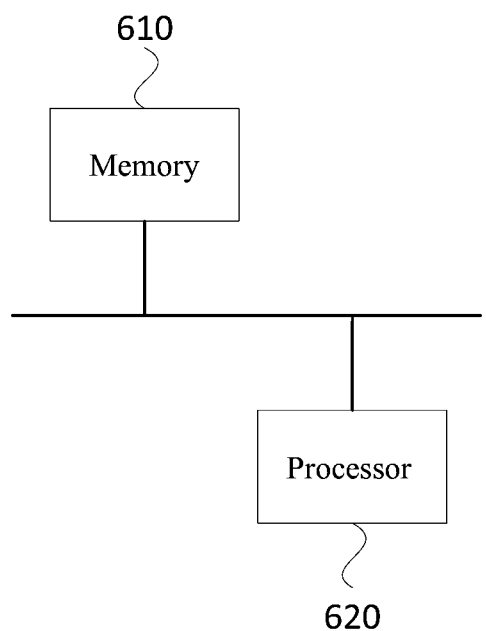
FIG. 6 is a structural schematic diagram of a device provided by an embodiment of the present disclosure.

FIG. 6 is a structural schematic diagram of a device provided by an embodiment of the present disclosure. As shown in FIG. 6, the device provided by the present disclosure includes: a processor 610 and a memory 620. The number of processors 610 in the device may be one or more, and the number of processors 610 being one is taken as an example in FIG. 6. The number of memories 620 in the device may be one or more, and the number of memory 620 being one is taken as an example in FIG. 6. The processor 610 and the memory 620 of the device may be connected by a bus or by other means, and bus connection is taken as an example in FIG. 6. In an embodiment, the device is a user equipment.

the memory 620, as a computer-readable storage medium, may be configured to store software programs, computer-executable programs and modules, such as program instructions/modules (for example, the first receiving module 420 and the second receiving module 440 in the apparatus for receiving system information) corresponding to the device of any embodiment of the present disclosure. The memory 620 may include a program storage area and a data storage area, where the program storage area may store the operating system and application programs required for at least one function. The data storage area may store data created according to the use of the device, etc. The memory 620 may include a high-speed random access memory and a nonvolatile memory, such as at least one magnetic disk memory device, flash memory device, or other nonvolatile solid-state memory devices. In some examples, the memory 620 may further include memories remotely arranged with respect to the processor 610, and these remote memories may be connected to the device via a network. Examples of the above-mentioned network include the Internet, an intranet, a local area network, a mobile communication network, and a combination thereof.

The device provided above may be configured to execute the method for receiving system information applied to a user equipment, which is provided by any of the above-mentioned embodiments, and may be provided with corresponding functions.

When the device is a base station, the program stored in the corresponding memory 620 may be program instructions/modules corresponding to the method for sending system information applied to a base station which is provided by the embodiments of the present disclosure. By running the software programs, instructions and modules stored in the memory 620, the processor 610 may execute one or more functional applications and data processing of the computer device, that is, implementing the method for sending system information applied to a base station in the above method embodiment. When the above device is a base station, it may execute the method for sending system information applied to a base station which is provided by any embodiment of the present disclosure, and may be provided with corresponding functions.

An embodiment of the present disclosure further provides a non-transitory computer-readable storage medium containing computer-executable instructions which, when executed by a computer processor, is configured to execute a method for receiving system information, the method being applied to a user equipment side and including: receiving system information (SI) reception indication information sent by a base station; and receiving system information indicated by the SI reception indication information.

An embodiment of the present disclosure further provides a non-transitory computer-readable storage medium containing computer-executable instructions which, when executed by a computer processor, is configured to execute a method for sending system information, the method being applied to a base station side and including: sending system information (SI) reception indication information to a user equipment (UE); and sending system information indicated by the SI reception indication information to the UE.

Those having ordinary skill in the art should understand that the term "user equipment (UE)" covers any suitable type of user equipment capable of radio communication, such as mobile phones, portable data processing devices, portable web browsers or vehicle-mounted mobile stations.

Generally speaking, various embodiments of the present disclosure may be implemented in hardware or dedicated circuitry, software, logic or any combination thereof. For example, some aspects may be implemented in hardware, while other aspects may be implemented in firmware or software that may be executable by a controller, a microprocessor or other computing devices, although the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source or object code written in any combination of one or more programming languages.

The block diagram of any logic flow in the accompanying drawings of the present disclosure may represent program steps, or may represent interconnected logic circuits, modules, and functions, or may represent a combination of program steps and logic circuits, modules, and functions. The computer program may be stored in the memory. The memory may be of any type suitable for the local technical environment and may be implemented using any suitable data storage technology, such as, but not limited to, Read-Only Memory (ROM), Random Access Memory (RAM), optical memory devices and systems (Digital Versatile Disc (DVD) or Compact Disk (CD)), etc. The computer readable medium may include a non-transitory storage medium. The data processor may be of any type suitable for the local technical environment, such as, but not limited to, a general-purpose computer, a specialized computer, a microprocessor, a digital signal processor (DSP), an application-specific integrated circuits (ASIC), a Field-Programmable Gate Array (FGPA), and a processor based on the multi-core processor architecture.

The invention claimed is:

1. A method for receiving system information, comprising:
   receiving system information (SI) reception indication information sent by a base station;
   receiving system information indicated by the SI reception indication information; and
   stopping monitoring a physical downlink control channel (PDCCH) in a gap pre-configured by the base station, wherein a user equipment (UE) receives the SI in the gap;
   wherein the gap in which the UE receives the SI comprises a first Gap and a second Gap,
   a length of the first Gap being an interval from a beginning of the UE stopping monitoring the PDCCH to a start of an SI window; and a length of the second Gap being an interval from an end of the SI window to a beginning of resuming monitoring the PDCCH.

2. The method of claim 1, after receiving system information indicated by the SI reception indication information, further comprising:
   sending a scheduling request (SR) to the base station.

3. The method of claim 2, after sending a scheduling request (SR) to the base station, further comprising:
   sending, in response to detecting an uplink grant (UL grant), an SI acknowledge message on an uplink channel indicated by the UL grant.

4. The method of claim 1, after receiving system information indicated by the SI reception indication information, further comprising:
   initiating a physical random access channel (PRACH) random access process.

5. The method of claim 4, after initiating a PRACH random access process, further comprising:
   sending an SI acknowledge message on a third radio resource control (RRC) message Msg3 of the PRACH random access process.

6. The method of claim 5, wherein
   the SI acknowledge message is an MAC CE message, which contains indication information acknowledging reception of SI;
   or, the SI acknowledge message is an MAC sub-header, which contains indication information acknowledging reception of SI;
   or, the SI acknowledge message is an RRC message, which contains indication information acknowledging reception of SI.

7. The method of claim 1, after receiving system information indicated by the SI reception indication information, further comprising:
   sending uplink information carrying an SI acknowledge message to the base station.

8. The method of claim 7, wherein sending uplink information carrying an SI acknowledge message to the base station comprises:
sending a media access control (MAC) control element (CE) message and the uplink information which carry the SI acknowledge message to the base station via UL grant.

9. The method of claim 7, wherein the SI acknowledge message is determined by means of one of: a new logical channel identity (LCID) in an MAC sub-header, a reserved bit of an existing MAC CE message, or a new LCID in the existing MAC CE message, the new LCID being obtained by redefining or adding a function to an LCID in the existing MAC CE message.

10. A non-transitory computer-readable storage medium storing a computer program which, when executed by a processor, causes the processor to perform the method for receiving system information of claim 1.

11. A method for sending system information, comprising:
sending system information (SI) reception indication information to a user equipment (UE);
sending system information indicated by the SI reception indication information to the UE; and
stopping sending downlink information in a gap pre-configured by a base station, wherein the user equipment (UE) receives the SI in the gap;
wherein the gap in which the UE receives the SI comprises a first Gap and a second Gap,
a length of the first Gap being an interval from a beginning of stopping monitoring a physical downlink control channel (PDCCH) to a start of an SI window; and a length of the second Gap being an interval from an end of the SI window to a beginning of resuming monitoring the PDCCH.

12. The method of claim 11, after sending system information indicated by the SI reception indication information to the UE, further comprising:
receiving a scheduling request (SR) sent by the UE.

13. The method of claim 11, after sending system information indicated by the SI reception indication information to the UE, further comprising:
sending an uplink grant (UL Grant) to schedule uplink information transmission.

14. A non-transitory computer-readable storage medium storing a computer program which, when executed by a processor, causes the processor to perform the method for sending system information of claim 11.

15. An apparatus for receiving system information, comprising a processor and a memory storing a computer program which, when executed by the processor, causes the processor to perform a method for receiving system information comprising:
receiving system information (SI) reception indication information sent by a base station;
receiving system information indicated by the SI reception indication information; and
stopping monitoring a physical downlink control channel (PDCCH) in a gap pre-configured by the base station, wherein a user equipment (UE) receives the SI in the gap;
wherein the gap in which the UE receives the SI comprises a first Gap and a second Gap,
a length of the first Gap being an interval from a beginning of the UE stopping monitoring the PDCCH to a start of an SI window; and a length of the second Gap being an interval from an end of the SI window to a beginning of resuming monitoring the PDCCH.

16. An apparatus for sending system information, comprising a processor and a memory storing a computer program which, when executed by the processor, causes the processor to perform a method for sending system information comprising:
sending system information (SI) reception indication information to a user equipment (UE);
sending system information indicated by the SI reception indication information to the UE and
stopping sending downlink information in a gap pre-configured by a base station, wherein the user equipment (UE) receives the SI in the gap;
wherein the gap in which the UE receives the SI comprises a first Gap and a second Gap,
a length of the first Gap being an interval from a beginning of stopping monitoring a physical downlink control channel (PDCCH) to a start of an SI window; and a length of the second Gap being an interval from an end of the SI window to a beginning of resuming monitoring the PDCCH.

* * * * *